Figure 1:
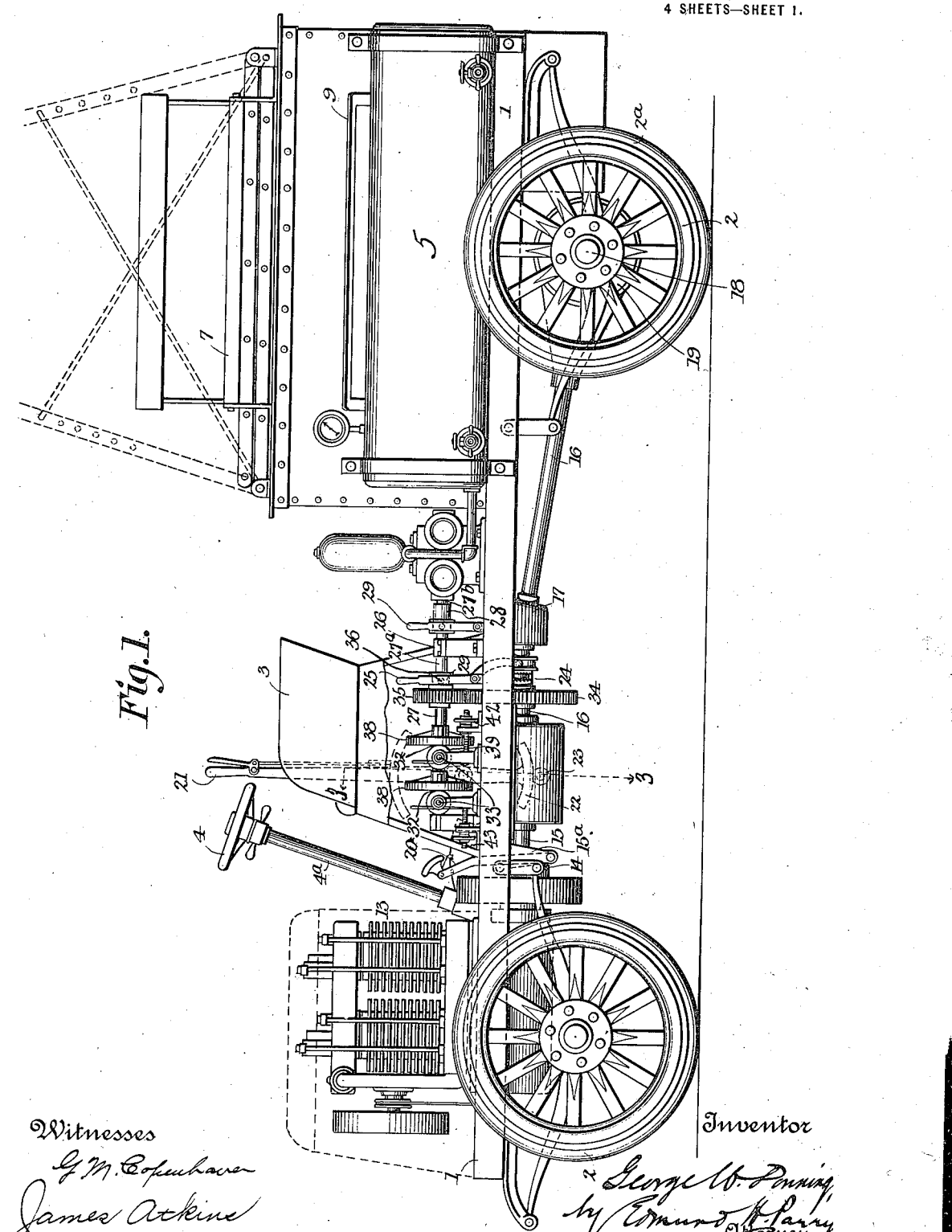

G. W. DONNING.
MACHINE FOR TREATING TREES.
APPLICATION FILED APR. 13, 1910.

1,170,967.

Patented Feb. 8, 1916.
4 SHEETS—SHEET 2.

Witnesses
Inventor

G. W. DONNING.
MACHINE FOR TREATING TREES.
APPLICATION FILED APR. 13, 1910.

1,170,967.

Patented Feb. 8, 1916.
4 SHEETS—SHEET 3.

Witnesses
G. M. Cokenhaver,
James Atkins

Inventor
George W. Donning,
by Edmund H. Parry
Attorney

G. W. DONNING.
MACHINE FOR TREATING TREES.
APPLICATION FILED APR. 13, 1910.

1,170,967.

Patented Feb. 8, 1916.
4 SHEETS—SHEET 4.

UNITED STATES PATENT OFFICE.

GEORGE W. DONNING, OF STAMFORD, CONNECTICUT.

MACHINE FOR TREATING TREES.

1,170,967.  Specification of Letters Patent.  Patented Feb. 8, 1916.

Application filed April 13, 1910. Serial No. 555,193.

*To all whom it may concern:*

Be it known that I, GEORGE W. DONNING, a citizen of the United States, residing at Stamford, in the county of Fairfield and State of Connecticut, have invented certain new and useful Improvements in Machines for Treating Trees and for other Purposes, of which the following is a specification.

This invention in one aspect relates to tree treatment and, in another aspect, to portable power producing and operating mechanisms for use in connection therewith, or for other appropriate use.

The object of the invention is to produce mechanism, preferably of the simplest, and most readily operated form, and which is adapted to provide power to and operation of, one or more devices, such as tree boring, tree-cutting, tree-brushing, etc.

A further object is to provide mechanism, mounted on a permanent base or upon a wheeled structure, for operating one or a plurality of tools of form appropriate for boring, cutting, brushing, or for otherwise treating, trees.

A further object is to provide a power plant and suitable mechanism operated thereby for actuating tools or other devices adapted for use on or about a farm, and in other situations also.

A further object is to provide a portable power plant, power-transmitting shafts (or other form of operating connections), and appropriate tools deriving motion from said power plant through said shafts or operating connections.

A further object is to provide a vehicle of appropriate character for supporting a power-producing structure, shafting or other form of connection adapted to be driven thereby, suitable devices connecting with and operated by said shafting, etc., and means for controlling the operation of said devices.

A further object is to provide a vehicle or the like of appropriate character for supporting a power-producing structure, one or a plurality of power-transmitting elements connecting with and operated by said power-producing structure, one or a plurality of auxiliary power-devices connecting with and operated by said structure, and means for controlling said auxiliary power-devices.

With these and other important objects in view, the invention resides in the structures, devices, combination of elements, and novel aggroupment of devices as hereinafter fully described and claimed.

Figure 2:
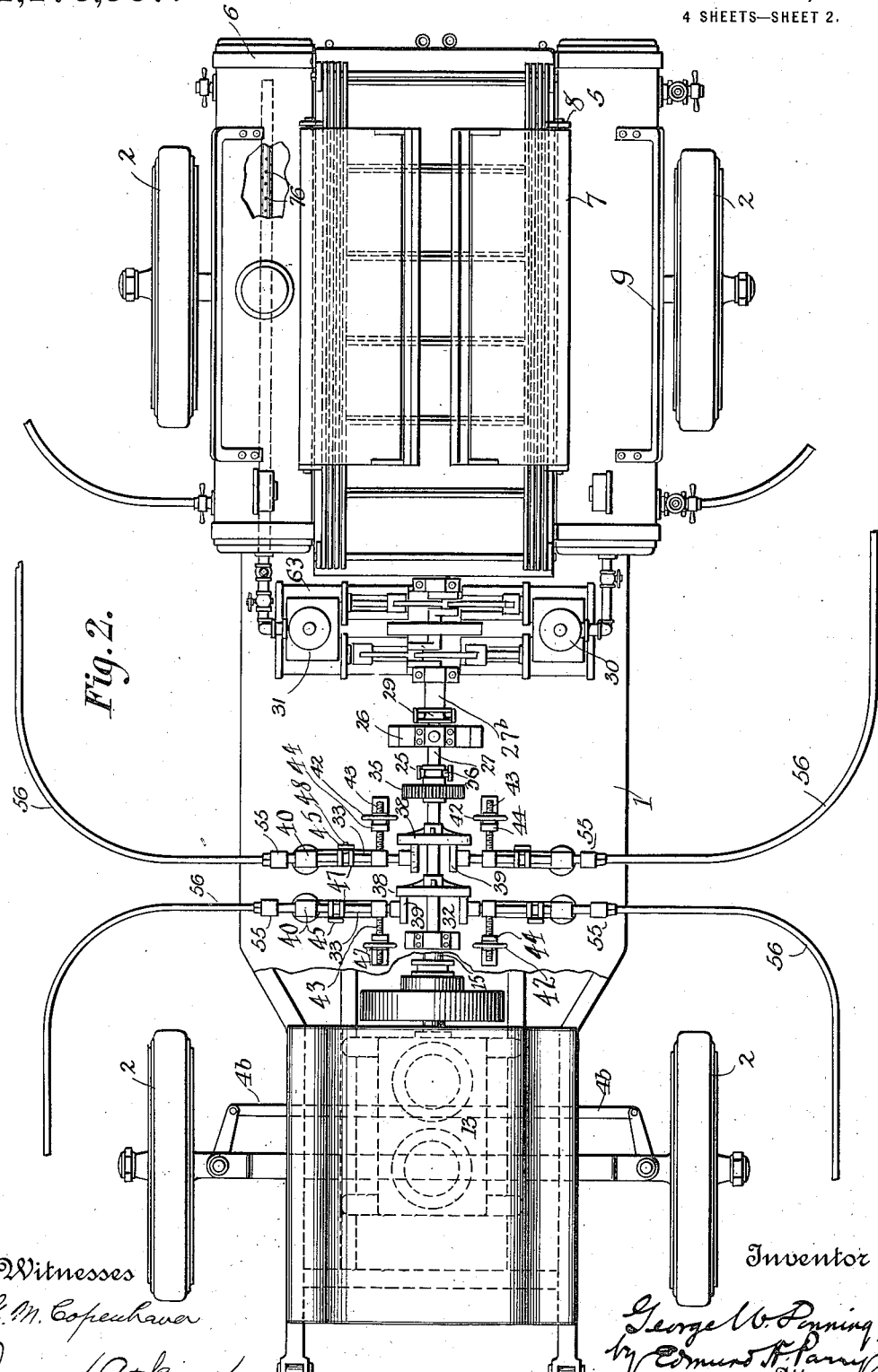
Figure 3:
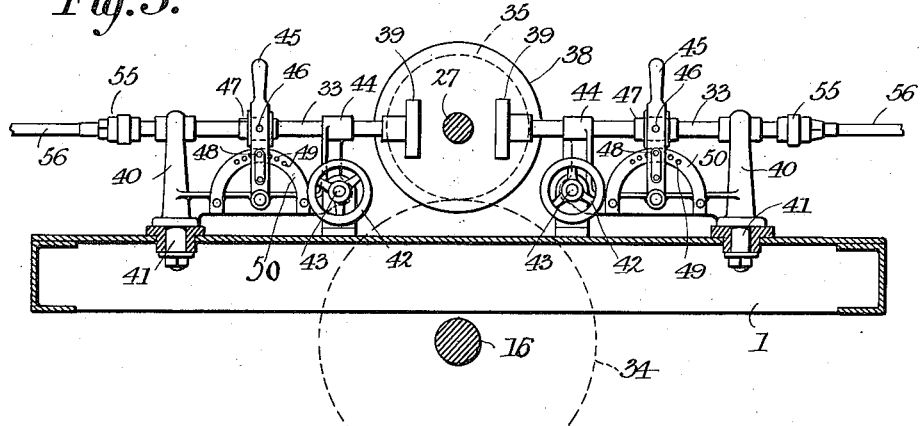
Figure 4:
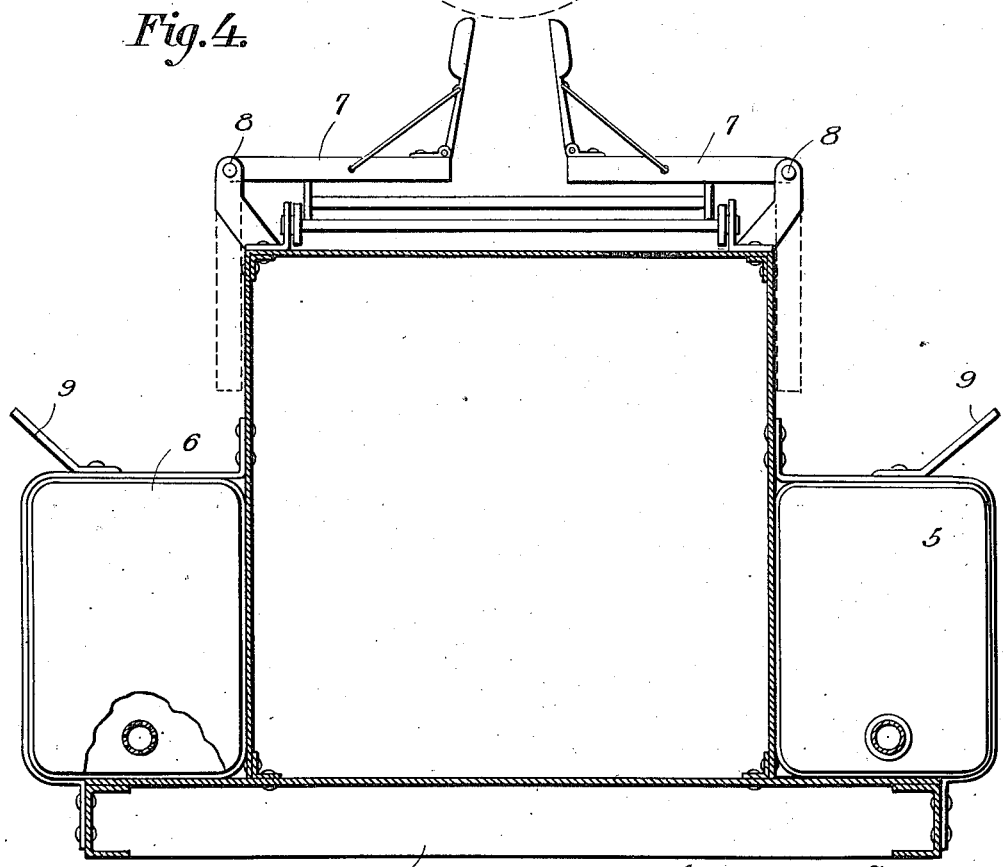

In the accompanying drawings,—forming a part of this specification and in which like letters of reference indicate corresponding parts, and wherein I have illustrated, (by way of example) one of many embodiments and applications of my invention, and which is, of course, susceptible of various modifications and rearrangement without departing from the spirit of my invention—Figure 1 is a view in side elevation of a vehicle upon which is supported the power-producing structure forming a part of my invention; Fig. 2 is a view in plan of the same; Fig. 3 is a fragmentary view in vertical transverse section, taken on the line 3—3, Fig. 1, showing a form of shaft-shifting mechanism which I may employ; Fig. 4 is a fragmentary view in rear elevation, showing the relative position of the compressed-air reservoir, spraying-liquid tank, tool-box, seats, etc.; and Fig. 5 is a perspective view showing the power-producing and other apparatus as in operation.

In these drawings:

*Vehicle.*—The numeral 1 designates the body or frame of a vehicle that is supported on wheels 2, 2. The tires 2$^a$ of the wheels may be provided with anti-slipping devices of any well known form. Generally, these tires would be of steel and provided with points or projections. It is to be understood that I may omit the wheels and support said frame on standards or rest it on the ground or floor, as the exigencies of use may require. At the forward end of the frame is mounted a driver's seat 3. In the present instance, the vehicle is illustrated as self-propelled. It is to be understood, however, that it may be provided with a tongue or with shafts so that draft-animals may be hitched thereto to pull it from place to place. Adjacent to the driver's seat is a steering-wheel 4 and wheel-post 4$^a$ forming a part of the steering-mechanism 4$^b$ of the vehicle, the same being connected to the front wheels in any preferred manner. Suitably mounted at the rear of the vehicle-body, at one side is an air-reservoir 5, which is adapted to be operated by actuating mechanism presently to be described, but which reservoir specifically forms no part of the present invention. At the opposite side, is liquid-holding tank 6, which is also adapted to be operated by the aforementioned actuating mechanism.

Figure 5:
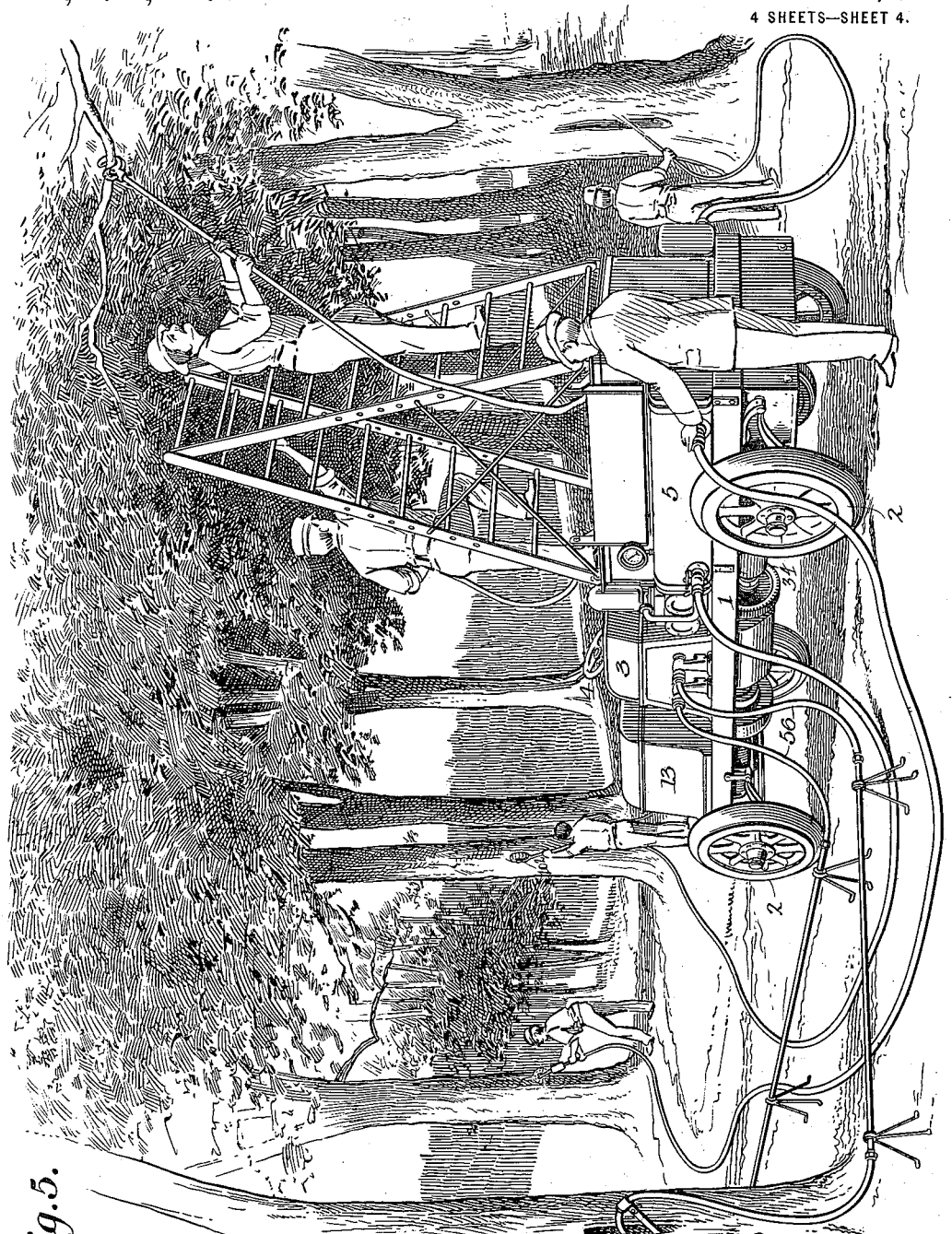

As shown in Figs. 1, 4 and 5, longitudinally-extending seats 7, 7 are provided above the reservoir 5 and tank 6, respectively, for the attendants. The seats are preferably foldable and hinged at 8, as shown in Fig. 4 so that they may be positioned out of the way, as shown in dotted lines in said figure. Foot-rests 9 may be secured to the top of the tanks, etc., as shown.

*Power and speed control mechanism.*— The various operations, for which the apparatus is designed, are accomplished by means of various instrumentalities of appropriate character. Power for all of these purposes is preferably and conveniently furnished by the motor which drives the vehicle, the preferred form of driving mechanism being generally arranged as follows: A gas-engine 13 is mounted toward the forward end of the frame 1 of the vehicle and is connected by clutch-mechanism 14 to a longitudinal shaft 15 connected through a variable-speed-change mechanism 15ª to a driving shaft 16. The driving shaft 16 is provided with a flexible coupling 17 which permits angular variations in position to the rear portion of the shaft 16 to allow for variations in position of the driven rear-axle 18 to which the shaft 16 is connected through an incased gearing 19. The construction and arrangement of the parts described may be and preferably are similar to those now in general use in automobile and motor vehicle construction.

The clutch-mechanism 14 is controlled by a lever 20 preferably operated by the foot of the operator; and the speed-change mechanism 15ª is controlled by a pivoted hand-lever 21 operating through a rack 22 and pinion 23 to increase or diminish the speed of the rear portion of the shaft 16. This shaft 16 is divided between the speed-change mechanism 15ª and the flexible-coupling 17, and the two ends are connected by a sliding coupling 24 controlled in its movement by a hand-lever 25 extending above the frame 1 of the machine and adapted to control the movement of a gear, presently to be explained.

As will readily be understood, the sliding coupling 24 acts to cut off the power furnished by the engine to the drive-wheels of the vehicle, and converts the machine (when then operated) from a motor-driven vehicle to a stationary engine mounted on a wheeled base.

*Drive for tool-operating shafts, air compressors, etc.*—Mounted above the frame 1, in suitable bearings 26, 26, is a longitudinal countershaft 27 divided into two parts 27ª and 27ᵇ, these parts being coupled or separated at will by a coupling 28 controlled by a hand-lever 29. The rear end 27ᵇ of the shaft 27 drives an air-compressor and pump-mechanism 30 and 31, respectively; and the forward end 27ª of the shaft (through friction gearing 32) drives the flexible tool-operating-shaft 33. Connection is made between the countershaft 27 and the underlying power-shaft 16 through gears 34 and 35 fixed to the shafts 16 and 27, respectively. The gear 35 is slidable on the countershaft 27 and its position is controlled by the hand-lever 25 which also controls the coupling of the shaft 16. This lever 25 is connected to the gear 35 by pins 36 engaging in a groove 37 in the hub of the gear 35. Movement of the lever 25, therefore, serves two purposes: first, it controls the connection of power to the driven-wheels of the vehicle; and, secondly, its application to this countershaft and tool-operating mechanism. While I prefer to perform both of these operations with one lever, it is obvious that separate levers may be used for each shaft. Obviously, I may locate the countershaft under the vehicle-frame, or connect it up with the gear of the speed-change. In this way, variable speeds and reverse are obtained direct, instead of in the manner presently to be described. Moreover, instead of employing the two gears 34 and 35 I could utilize a belt-drive from the power-shaft to the countershaft, in the well-known way. Furthermore, if the vehicle be horse-drawn, the engine would connect directly with the countershaft, and the main shaft would then be dispensed with.

*Tool-drive mechanism.*—The forward end of the countershaft 27 carries one or more friction disks 38, 38, adapted to drive friction pinions 39, 39 mounted on the ends of short driven-shafts 33. These shafts are movable in two directions in relation to the disks 38; one movement operating to make connection between the disks and driven-pinions, and the other to vary their relative speed.

The driven shafts 33 are transversely arranged in relation to the countershaft 27, and are carried on pivoted swinging standards or brackets 40 pivoted at 41 in the frame 1, and controlled in movement to and from the disks by a hand-wheel 42 operating on a screw 43 passing through bracket or standard 44 fixed to the frame 1. By operating the hand-wheel in one direction the brackets may be rotated to position the pinion 39 and disks 38 into operative contact. The reverse movement operates to disconnect the same.

Variation in speed is obtained by changing the distance at which the pinion 39 contacts with the disk 38 relative to the center of said disk, and this is controlled by shifting the shafts 33 endwise in their bearings. This shifting movement is controlled by hand-levers 45 pivoted to the center of the swinging brackets 40, and provided near their upper ends with pins 46 adapted to engage a grooved collar 47 secured centrally upon the shaft 33. At an intermediate point, the hand-levers 45 are provided with spring-locking pins 48 adapted to engage in holes 49 in a sector-plate 50 carried by the bracket 40.

As will be readily observed, by reference to Fig. 3 of the drawings, the arrangement is such that movement in one direction of the lever 45 will increase the speed of the driven shaft 33, and a reverse movement will decrease the speed, according to the position of the pinion relative to the center of the disk 38. Moreover, by this means any of the shafts may be disconnected from the drive-mechanism and their operation be thereby arrested temporarily or otherwise.

The outer ends of the driven shafts 33 are provided with socket-members 55, or the like, adapted to receive and hold the ends of flexible shafts 56, by which various operating tools may be driven.

It will be understood that while I have disclosed certain apparatus by way of example, I do not confine myself to the particular form or arrangement shown and described, since my invention comprehends, broadly, structures and apparatus for accomplishing the functions and results mentioned. I may, for instance, employ a steam engine, or an electric motor or dynamo, or other power-producing apparatus, for operating the flexible-shafts, etc.

It is manifest that, when the various shafts are in operative connection with the drive-mechanism, and the various instrumentalities operated thereby are operatively connected with their power-producing parts of the apparatus, several trees, or several portions of one tree, may be treated simultaneously, as shown, for instance, in Fig. 5.

Having now described my invention, what I claim and desire to secure by Letters-Patent is:

1. The combination, in tool-operating apparatus for treating trees, of tool-driving mechanism including a motor, a main drive-shaft connected therewith, vehicle-wheels operatively connected with said shaft, a counter-shaft arranged in juxtaposition to and in a relatively different horizontal plane from the drive-shaft and deriving motion therefrom, means for connecting the vehicle-wheels to the drive-shaft and disconnecting the same therefrom and for connecting and disconnecting the counter-shaft therewith and therefrom, respectively, tool-driving shafting driven by said counter-shaft and normally disconnected therefrom when the vehicle-wheels are connected with the shaft, and means for operatively connecting said shafting and said counter-shaft.

2. The combination, in tool-operating apparatus for treating trees, of tool-driving mechanism including a motor, a main drive-shaft connected therewith, vehicle-wheels operatively connected with said shaft, a counter-shaft arranged in juxtaposition to the drive-shaft and deriving motion therefrom, means for connecting the vehicle-wheels to the drive-shaft and disconnecting the same therefrom and for connecting and disconnecting the counter-shaft therewith and therefrom, respectively, tool-driving shafting driven by said counter-shaft, means for bodily swinging said shafting operatively to connect said shafting and said counter-shaft, and means for actuating said shafting axially in relation to the counter-shaft to vary the speed of said shafting.

3. The combination, in tool-operating apparatus for treating trees, of tool-driving mechanism including a motor, a main drive-shaft connected therewith, vehicle-wheels operatively connected with said shaft, a counter-shaft arranged in juxtaposition to the drive-shaft and deriving motion therefrom, means for connecting the vehicle-wheels to the drive-shaft and disconnecting the same therefrom and for connecting and disconnecting the counter-shaft therewith and therefrom, respectively, tool-driving shafting driven by said counter-shaft, means for operatively connecting said shafting and said counter-shaft, speed-change mechanism connecting with said drive-shaft, and means independent of said speed-change mechanism for shifting said shafting axially in relation to said counter-shaft progressively to vary the speed of said shafting.

4. The combination, in tool-operating apparatus for treating trees, of tool-driving mechanism including a motor, a main drive-shaft connected therewith, vehicle-wheels operatively connected with said shaft, a counter-shaft arranged in juxtaposition to the drive-shaft and deriving motion therefrom, means for connecting the vehicle-wheels to the drive-shaft and disconnecting the same therefrom and for connecting and disconnecting the counter-shaft therewith and therefrom, respectively, tool-driving shafting driven by said counter-shaft, means for operatively connecting said shafting and said counter-shaft, speed-change mechanism connecting with said drive-shaft, means independent of said speed-change mechanism for shifting said shafting axially in relation to said counter-shaft progressively to vary the speed of said shafting, and means for locking in any of a plurality of operating positions the means for varying the speed of said shafting.

5. The combination, in tool-operating apparatus for treating trees, of tool-driving mechanism including a motor, a main drive-shaft connected therewith, vehicle-wheels operatively connected with said shaft, a counter-shaft arranged in juxtaposition to the drive-shaft and deriving motion therefrom, means for connecting the vehicle-wheels to the drive-shaft and disconnecting the same therefrom and for connecting and disconnecting the counter-shaft therewith and therefrom, respectively, tool-driving shafting driven by said counter-shaft, means for operatively connecting said shafting and said counter-shaft, and a swinging support at all times under the control of the operator for swingingly sustaining said tool-driving shafting.

6. The combination, in tool-operating apparatus for treating trees, of tool-driving mechanism including a motor, a main drive-shaft operatively connected therewith, vehicle-wheels connecting with said shafting, a vehicle-supported by said vehicle-wheels, a counter-shaft arranged in juxtaposition to and in a relatively different horizontal plane from the drive-shaft, operating connections between said shafts, a plurality of independent tool-driving shafts arranged angularly to and driven by said counter-shaft and disposed in substantially the same horizontal plane as the counter-shaft, and means for connecting each of said shafts and the counter-shaft to said drive-shaft whereby said shafting and the vehicle are moved simultaneously.

7. The combination, in tool-operating apparatus, of tool-driving mechanism including a motor, a main drive-shaft connected therewith, speed-change mechanism operatively connected to said main drive, vehicle-wheel connecting with and driven by said shaft, a counter-shaft arranged in juxtaposition to the drive-shaft and deriving motion therefrom, a plurality of independent tool-driving shafts angularly arranged in relation to the counter-shaft, and independent speed-change mechanisms therefor, each swingingly supported in relation to the counter-shaft for independent operation thereby.

8. The combination, in tool-operating apparatus, of tool-driving mechanism including a motor, clutch-mechanism connecting therewith, a main drive-shaft operatively connecting with the motor, clutch-mechanism independent of said first-mentioned clutch-mechanism connecting with said shaft, vehicle-wheels driven by said shaft, a counter-shaft arranged in juxtaposition to the drive-shaft, a plurality of independently-operated tool-driving shafts disposed for running connection with the counter-shaft, means for disengaging any of said shafts from operative connection with the counter-shaft, means for connecting said counter-shaft to said drive-shaft, a compressor operatively connected to and actuated by said counter-shaft, and compressed-air conduits leading from said compressor.

9. The combination of a portable tool-driving mechanism including a motor, a main drive-shaft operated thereby, vehicle-wheels connecting with said shaft, means for connecting the vehicle-wheels to and disconnecting them from said shaft, and a tool-actuating counter-shaft operated by said main shaft and occupying a horizontal plane different from the drive-shaft, running-connections between the shaft, and tool-operating shafts arranged for connection with said counter-shaft.

10. The combination of a portable tool-driving mechanism including a motor, a main drive-shaft operated thereby, vehicle-wheels connecting with said shaft, means for connecting the vehicle-wheels to and disconnecting them from said shaft, a tool-actuating member operated by said main shaft, and a series of extensible tool-driving shaftings independently driven by said tool-actuating member.

11. The combination of a portable tool-driving mechanism including a motor, a main drive-shaft operated thereby, vehicle-wheels driven by said shaft, a speed-change device connecting with the main-shaft, means for connecting the drive-shaft to and disconnecting the same from the vehicle-wheels, a tool-actuating member operated by said shaft, and a series of tool driving extensible shaftings independently driven by said actuating member.

12. The combination, in tool-operating apparatus for treating trees, of tool-driving mechanism including a motor, a main drive-shaft connected therewith, vehicle-wheels operatively connected with said shaft, a counter-shaft arranged in juxtaposition to the drive-shaft and deriving motion therefrom, means for connecting the vehicle-wheels to the drive-shaft and disconnecting the counter-shaft therewith and therefrom, respectively, tool-driving shafting driven by said counter-shaft, means for bodily swinging said shafting operatively to connect said shafting and said counter-shaft, means for actuating said shafting axially in relation to the counter-shaft to vary the speed of said shafting, a friction-disk on said counter-shaft, and friction-disks on said shafting and positionable into and out of engagement with the counter-shaft disk.

13. The combination, in tool-operating apparatus for treating trees, of tool-driving mechanism including a motor, a main drive-shaft connected therewith, vehicle-wheels operatively connected with said shaft, a counter-shaft arranged in juxtaposition to the drive-shaft and deriving motion therefrom, means for connecting the vehicle-wheels to the drive-shaft and disconnecting the counter-shaft therewith and therefrom, respectively, tool-driving shafting driven by said counter-shaft, means for bodily swinging said shafting operatively to connect said shafting and said counter-shaft, means for actuating said shafting axially in relation to the counter-shaft to vary the speed of said shafting, a friction-disk on said counter-shaft, and friction-disks on said shafting and positionable into and out of engagement with the counter-shaft disk and slidable along the face of said disk when said shafting is shifted axially.

14. The combination, in tool-operating apparatus for treating trees, of tool-driving mechanism including a motor, a main drive-shaft connected therewith, vehicle-wheels operatively connected with said shaft, a counter-shaft arranged in juxtaposition to the drive-shaft and deriving motion therefrom, means for connecting the vehicle-wheels to the drive-shaft and disconnecting the same therefrom and for connecting and disconnecting the counter-shaft therewith and therefrom, respectively, tool-driving shafting driven by said counter-shaft, means for operatively connecting said shafting and said counter-shaft including a disk on said counter-shaft, a disk on the tool-driving shafting positionable into and out of engagement with the counter-shaft disk, a swinging support at all times under the control of the operator for swingingly sustaining said tool-driving shafting, and a hand-wheel for swinging the support.

15. The combination, in tool-operating apparatus for treating trees, of tool-driving mechanism including a motor, a main drive-shaft connected therewith, vehicle-wheels operatively connected with said shaft, a counter-shaft arranged in juxtaposition to the drive-shaft and deriving motion therefrom, means for connecting the vehicle wheels to the drive-shaft and disconnecting the same therefrom and for connecting and disconnecting the counter-shaft therewith and therefrom, respectively, tool-driving shafting driven by said counter-shaft, means for operatively connecting said shafting and said counter-shaft including a disk on said counter-shaft, a disk on the tool-driving shafting positionable into and out of engagement with the counter-shaft disk, a swinging support at all times under the control of the operator for swingingly sustaining said tool-driving shafting, a hand-wheel for swinging the support, and a hand-lever for shifting the disk on the tool-driving shaft along the face of the disk on the counter-shaft.

In testimony whereof I affix my signature in presence of two witnesses.

GEORGE W. DONNING.

Witnesses:
H. M. THOMPSON,
ANNIE E. THOMPSON.